United States Patent
Mishra

(10) Patent No.: US 7,106,934 B1
(45) Date of Patent: Sep. 12, 2006

(54) NON-ZERO DISPERSION SHIFTED OPTICAL FIBER

(75) Inventor: Snigdharaj K. Mishra, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/174,047

(22) Filed: Jun. 30, 2005

(51) Int. Cl.
*G02B 6/02* (2006.01)

(52) U.S. Cl. ................ 385/127; 385/123; 385/124; 385/126; 385/141

(58) Field of Classification Search ............ 385/123, 385/124, 126, 127, 128, 141, 142, 143, 144; 398/81
See application file for complete search history.

(56) References Cited

U.S. PATENT DOCUMENTS

| | | | |
|---|---|---|---|
| 5,327,516 A | 7/1994 | Chraplyvy et al. | 385/123 |
| 5,553,185 A | 9/1996 | Antos et al. | 385/127 |
| 5,649,044 A | 7/1997 | Bhagavatula | 385/124 |
| 5,748,824 A | 5/1998 | Smith | 385/124 |
| 6,266,467 B1 | 7/2001 | Kato et al. | 385/123 |
| 6,321,016 B1* | 11/2001 | Tirloni et al. | 385/127 |
| 6,396,987 B1 | 5/2002 | de Montmorillon et al. | 385/123 |
| 6,421,491 B1 | 7/2002 | Liu | 385/127 |
| 6,424,776 B1 | 7/2002 | Nouchi et al. | 385/123 |
| 6,490,396 B1 | 12/2002 | Smith | 385/123 |
| 6,532,331 B1* | 3/2003 | Kato et al. | 385/123 |
| 6,535,676 B1 | 3/2003 | de Montmorillon et al. | 385/123 |
| 6,577,800 B1 | 6/2003 | Sarchi et al. | 385/123 |
| 6,612,756 B1 | 9/2003 | Sillard et al. | 398/148 |
| 6,625,359 B1 | 9/2003 | Nouchi et al. | 385/123 |
| 6,628,873 B1 | 9/2003 | Sillard et al. | 385/124 |
| 6,684,016 B1 | 1/2004 | Kim et al. | 385/123 |
| 6,684,018 B1 | 1/2004 | Arai et al. | 385/127 |
| 6,856,743 B1 | 2/2005 | Bickham | 385/127 |
| 2004/0126074 A1* | 7/2004 | Bickham et al. | 385/127 |
| 2005/0063663 A1* | 3/2005 | Anderson et al. | 385/142 |
| 2005/0185906 A1* | 8/2005 | Bickham et al. | 385/124 |

FOREIGN PATENT DOCUMENTS

WO WO 2004/011975 2/2004

* cited by examiner

*Primary Examiner*—Brian M. Healy
(74) *Attorney, Agent, or Firm*—Joseph M. Homa

(57) ABSTRACT

A low attenuation optical waveguide fiber having medium dispersion is disclosed. The core and the cladding are selected to provide a spectral attenuation at 1550 nm of less than 0.195 dB/km. The optical fiber exhibits an effective area of greater than about 60 $\mu m^2$ at a wavelength of about 1550 nm, a dispersion slope of less than 0.07 $ps/nm^2/km$ at a wavelength of about 1550 nm, and a zero-dispersion wavelength of less than about 1500 nm.

19 Claims, 5 Drawing Sheets

NON-ZERO DISPERSION SHIFTED OPTICAL FIBER

BACKGROUND OF THE INVENTION

1. Field of the Invention

The present invention relates to non-zero dispersion shifted optical fibers (NZDSF), or NZDS fibers, or NZ-DSF's.

2. Technical Background

Wavelength division multiplexing (WDM) systems have operated around the 1550 nm wavelength region, defined herein as including the C-band, which includes wavelengths between about 1525 nm to about 1565, and the L-band, which includes wavelengths between about 1565 nm to about 1625 nm. Some known fibers have a zero dispersion wavelength located outside the operation window which may help prevent nonlinear penalties such as four-wave mixing (FWM) and cross-phase modulation (XPM). However, the zero dispersion wavelength of known NZDSF fibers is typically within 100 nm of 1550 nm in order to reduce the magnitude of the dispersion of a transmitted signal in the 1550 nm operating window so as to allow longer span lengths and less frequent dispersion compensation.

Preferably, coarse wavelength division multiplexing (CWDM) systems and applications operate in the WDM 1550 nm window, i.e. in the C-and L-bands, in the S-band (between about 1450 nm and about 1525 nm), and in the 1310 nm window (between about 1280 nm and about 1330 nm).

Known fibers have optical characteristics which are suitable for operation in specific windows. For example, standard single mode transmission fibers, such as the SMF-28™ optical fiber manufactured by Corning Incorporated, have a zero dispersion wavelength at or near 1310 nm, and such fibers can perform suitably in the 1310 nm window. The dispersion exhibited by such optical fiber at 1550 nm is around 17 ps/nm/km, which is larger than the dispersion at 1550 nm of typical NZDSF fiber, and which can require frequent dispersion compensation. NZDSF optical fiber can perform suitably in the 1550 nm window. Examples of NZDSF fiber include: LEAF® fiber by Corning Incorporated which has an average zero dispersion wavelength near 1500 nm and a dispersion slope of about 0.08 ps/nm/km at about 1550 nm, Submarine LEAF® fiber by Corning Incorporated which has an average zero dispersion wavelength near 1590 nm and a dispersion slope of about 0.1 ps/nm/km at about 1550 nm, MetroCor® fiber by Corning Incorporated which has a zero dispersion wavelength near 1650 nm, and Truewave RS™ fiber by Lucent Corporation which has a zero dispersion wavelength of about 1450 nm. However, the magnitude of the dispersion in the 1310 nm window of these NZDSF optical fibers is not low, and many NZDSF fibers have specified cable cutoff wavelengths which are greater than 1260 nm.

SUMMARY OF THE INVENTION

Optical fiber disclosed herein comprises a core having a centerline and a refractive index profile and a cladding surrounding the core. The core comprises a central region extending radially outwardly from the centerline, a first annular region surrounding the central region, and a second annular region surrounding the first annular region. The central region has a relative refractive index profile, $\Delta_1(r)$, having a maximum relative refractive index $\Delta_{1MAX}$ not more than 0.55%, wherein $\Delta_1(r)$ is positive. The first annular region has a relative refractive index profile, $\Delta_2(r)$. The second annular region has a relative refractive index profile, $\Delta_3(r)$, having a maximum relative refractive index $\Delta_{3MAX}$ less than 0.15%, wherein $\Delta_3(r)$ is positive. The refractive index profile of the core and the cladding are selected to provide a spectral attenuation at 1550 nm of less than 0.195 dB/km, preferably less than 0.193 dB/km, more preferably less than 0.191 dB/km. In some preferred embodiments, the refractive index profile of the core and the cladding are selected to provide a spectral attenuation at 1550 mm of less than 0.188 dB/km.

The second annular region, or "ring", is offset from the central region by the first annular region. In some preferred embodiments, the first annular region comprises a non-negative relative refractive index portion (either positive or zero, in %). In some preferred embodiments, the first annular region comprises a negative relative refractive index portion. In some preferred embodiments, the first annular region consists of a non-negative relative refractive index portion. In some preferred embodiments, the first annular region consists of a negative relative refractive index portion. In some preferred embodiments, the first annular region comprises a non-negative relative refractive index portion and a negative relative refractive index portion. Thus, in the various embodiments, the ring is offset from the central region by the first annular region which has a positive index portion, a negative index portion, or a portion having a relative refractive index of 0, or some combination thereof. In some preferred embodiments, the first annular region comprises a first portion having a relative refractive index profile $\Delta_{2A}(r)<0$, and a second portion, surrounding and directly adjacent the first portion of the first annular segment, and having a relative refractive index profile, $\Delta_{2B}(r) \geq 0$; preferably $\Delta_{2B}(r)$ has a maximum absolute magnitude of relative refractive index $|\Delta_{2B}|_{MAX}<0.03\%$. Preferably, the second annular region has a width, $w_3$, greater than 4 μm, more preferably greater than 6 μm, and even more preferably between 6 and 12 μm. Preferably, the second annular region has a midpoint at a radius of 9 to 13 μm, more preferably 10 to 12 μm. Preferably, the second annular region has a half height peak width of between 2 and 7 μm, and in some preferred embodiments between 3 and 6 μm, and has a half height midpoint of between 9 and 12 μm.

In some preferred embodiments, the first annular region has a maximum absolute magnitude of the relative refractive index $|\Delta_2|_{MAX}$ less than 0.1%. In other preferred embodiments, the first annular region has a maximum absolute magnitude of the relative refractive index $|\Delta_2|_{MAX}$ less than 0.06%, preferably less than 0.05%.

In some preferred embodiments, the core further comprises a third annular region surrounding the second annular region. Preferably, the third annular region is directly adjacent the second annular region. The third annular region has a relative refractive index profile $\Delta_4(r)<0$ with a minimum relative refractive index $\Delta_{4MAX}>-0.5\%$, and preferably $\Delta_{4MAX}$ is not less than −0.4%. $|\Delta_4|_{MAX}$ is preferably less than 0.5%, more preferably less than 0.45%. For those embodiments having a third annular region, the third annular region preferably has a width, $w_4$, greater than 5 μm, and more preferably between 6 and 9 μm. Preferably, the third annular region has a midpoint at a radius of 17 to 21 μm, more preferably 18 to 20 μm. Preferably, the third annular region has a half height peak width of between 4 and 7 μm and a half height midpoint of between 18 and 21 μm.

Preferably, the central region extends from the centerline to a radius R1 of between 3 and 5 µm, more preferably between 3.5 and 4.5 µm.

In preferred embodiments, the central region comprises a first portion extending radially outward from the centerline and having a relative refractive index profile, $\Delta_{1A}(r)$, having a maximum relative refractive index $\Delta_{1AMAX}$, and a second portion, surrounding and directly adjacent the first portion, and having a relative refractive index profile, $\Delta_{1B}(r)$, having a maximum relative refractive index $\Delta_{1BMAX}$, wherein $\Delta_{1AMAX} > \Delta_{1BMAX}$. In these embodiments, preferably $|\Delta_{1AMAX} - \Delta_{1BMAX}| > 0.05\%$, and more preferably $0.05\% < |\Delta_{1AMAX} - \Delta_{1BMAX}| < 0.30\%$. Preferably, $\Delta_{1A}(r)$ is substantially constant. Preferably, a substantial portion of $\Delta_{1B}(r)$, that is greater than 50% of its radial length, has an alpha profile, and more preferably a substantial portion of $\Delta_{1B}(r)$ has an alpha profile with an alpha ($\alpha_{1B}$) greater than 1, in order to further reduce attenuation. Preferably, $1 < \alpha_{1B} < 10$, more preferably $3 < \alpha_{1B} < 8$. In some preferred embodiments, $1 < \alpha_{1B} < 8$.

Preferably, the refractive index profile of the core and the cladding are selected to provide a zero dispersion at a wavelength less than 1500 nm, more preferably less than 1450 nm. In some preferred embodiments, a zero dispersion is at a wavelength less than 1430 nm. In some preferred embodiments, the fiber has a zero dispersion wavelength between 1350 and 1450 nm.

Preferably, the refractive index profile of the core and the cladding are selected to provide a dispersion at 1550 nm of between 6 and 10 ps/nm-km.

Preferably, the refractive index profile of the core and the cladding are selected to provide a dispersion at 1625 nm of between 11 and 15 ps/nm-km.

In some preferred embodiments, the refractive index profile of the core and the cladding are selected to provide a dispersion slope at 1550 nm of between 0.04 and 0.07 ps/nm²-km.

In some preferred embodiments, the refractive index profile of the core and the cladding are selected to provide a dispersion slope at 1550 nm of less than 0.060 ps/nm²-km. In some preferred embodiments, the dispersion slope at 1550 nm is less than 0.055 ps/nm²-km.

Preferably, the refractive index profile of the core and the cladding are selected to provide an effective area at 1550 nm of greater than 60 µm², more preferably between 60 and 85 µm².

Preferably the optical fiber described and disclosed herein allows suitable performance at a plurality of operating wavelength windows between about 1260 nm and about 1650 nm. More preferably, the optical fiber described and disclosed herein allows suitable performance at a plurality of wavelengths from about 1260 nm to about 1650 nm. In a preferred embodiment, the optical fiber described and disclosed herein is a dual window fiber which can accommodate operation in at least the 1310 nm window and the 1550 nm window.

Reference will now be made in detail to the present preferred embodiments of the invention, examples of which are illustrated in the accompanying drawings.

DETAILED DESCRIPTION OF THE PREFERRED EMBODIMENT

Figure 1:
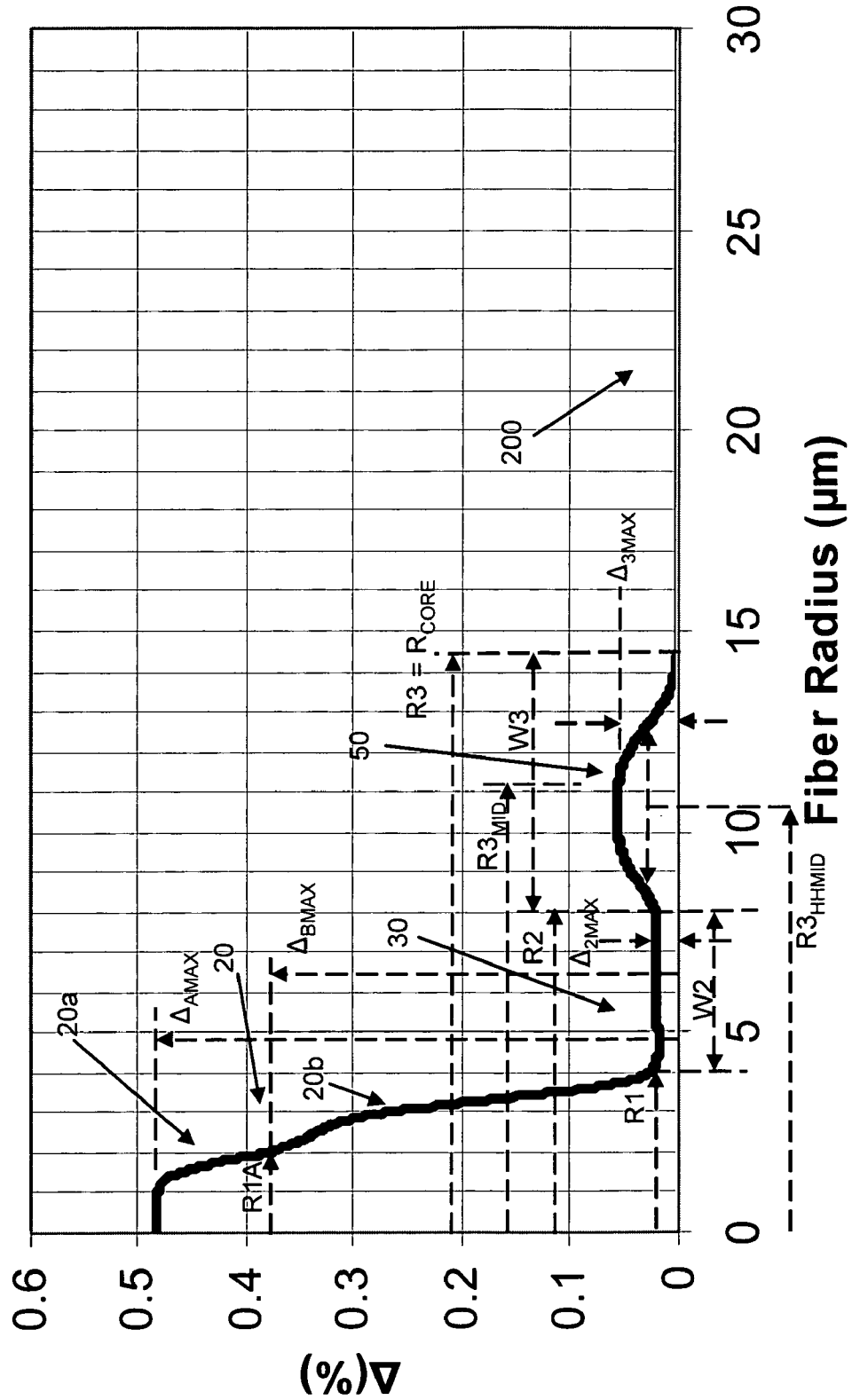
FIGS. 1–3 show refractive index profiles corresponding to a first set of preferred embodiments of an optical waveguide fiber as disclosed herein.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the average refractive index of the cladding region. As used herein, the relative refractive index is represented by $\Delta$ and its values are given in units of "%", unless otherwise specified. In cases where the refractive index of a region is less than the average refractive index of the cladding region, the relative index percent is negative and is referred to as having a depressed region or depressed index, and is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{\mathit{eff}} = 2\pi (\int f^2\ r\ dr)^2 / (\int f^4\ r\ dr),$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The term "α-profile" or "alpha profile" refers to a relative refractive index profile, expressed in terms of Δ(r) which is in units of "%", where r is radius, which follows the equation, $$\Delta(r) = \Delta(r_o)(1-[|r-r_o|/(r_1-r_0)]^\alpha),$$

where $r_o$ is the point at which Δ(r) is maximum, $r_1$ is the point at which Δ(r)% is zero, and r is in the range $r_i \leq r \leq r_f$, where Δ is defined above, $r_i$ is the initial point of the α-profile, $r_f$ is the final point of the α-profile, and α is an exponent which is a real number.

The mode field diameter (MFD) is measured using the Peterman II method wherein, 2w=MFD, and $w^2 = (2\int r^2\, dr / \int [df/dr]^2\, r\, dr)$, the integral limits being 0 to ∞.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied tot he plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39–44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement, i.e. no power is observed in the mode at wavelengths longer than the measured cutoff. The actual fiber cutoff can be measured by the standard 2m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-1 70".

Unless otherwise noted herein, optical properties (such as dispersion, dispersion slope, etc.) are reported for the LP01 mode.

A waveguide fiber telecommunications link, or simply a link, is made up of a transmitter of light signals, a receiver of light signals, and a length of waveguide fiber or fibers having respective ends optically connected to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical isolators, optical switches, optical filters, or multiplexing or demultiplexing devices. One may denote a group of inter-connected links as a telecommunications system.

A span of optical fiber as used herein includes a length of optical fiber, or a plurality of optical fibers fused together serially, extending between optical devices, for example between two optical amplifiers, or between a multiplexing device and an optical amplifier. A span may comprise one or more sections of optical fiber as disclosed herein, and may further comprise one or more sections of other optical fiber, for example as selected to achieve a desired system performance or parameter such as residual dispersion at the end of a span.

Various wavelength bands, or operating wavelength ranges, or wavelength windows, can be defined as follows: "1310 nm band" is 1260 to 1360 nm; "E-band" is 1360 to 1460 mm; "S-band" is 1460 to 1530 nm; "C-band" is 1530 to 1565 nm; "L-band" is 1565 to 1625 nm; and "U-band" is 1625 to 1675 nm.

The optical fiber disclosed herein comprises a core and a cladding layer (or cladding) surrounding and directly adjacent the core. The cladding has a refractive index profile, $\Delta_{CLAD}(r)$. Preferably, $\Delta_{CLAD}(r)=0$ throughout the cladding. The core comprises a refractive index profile, $\Delta_{CORE}(r)$.

Preferably, the core is comprised of silica doped with germanium, i.e. germania doped silica. Dopants other than germanium, singly or in combination, may be employed within the core, and particularly at or near the centerline, of the optical fiber disclosed herein to obtain the desired refractive index and density. In some preferred embodiments, the core of the optical fiber disclosed herein has an entirely non-negative relative refractive index profile. In other preferred embodiments, the core has an entirely positive refractive index profile. In still other preferred embodiments, the core has a relative refractive index profile with both positive and negative portions. The core is surrounded by and directly adjacent to a cladding layer.

Preferably, the refractive index profile of the optical fiber disclosed herein is positive from the centerline to the outer radius of the central region, R1. In preferred embodiments, the optical fiber contains no index-decreasing dopants in the central region of the core.

Optical waveguide fibers 100 are disclosed herein which preferably comprise: a central region 20 extending radially outwardly from the centerline to a central region outer radius, R1, and having a relative refractive index percent, $\Delta_1\%$ (r) with a maximum relative refractive index percent, $\Delta_{1MAX}$; a first annular region (or moat) 30 surrounding the central region 20 and directly adjacent thereto, extending radially outwardly to a first annular region outer radius, $R_2$, having a width $W_2$ disposed at a midpoint $R_{2MID}$, and having a relative refractive index percent, $\Delta_2\%$ (r); a second annular region (or ring) 50 surrounding the first annular region 30 and preferably directly adjacent thereto, having a width $W_3$ disposed at a midpoint $R_{3MID}$, and having a positive relative refractive index percent, $\Delta_3\%$ (r)>0, with a maximum relative refractive index percent, $\Delta_{3MAX}$, wherein preferably $\Delta_{1MAX}>\Delta_{3MAX}>0$; and an outer annular cladding region 200 surrounding the second annular region 50 and preferably adjacent thereto and having a relative refractive index percent, $\Delta_c\%$ (r). The first annular region may have a maximum relative refractive index, $\Delta_{2MAX}$, and/or a minimum relative refractive index, $\Delta_{2MIN}$, and/or $\Delta_2\%$ (r) may be 0 or essentially 0. The core ends and the cladding begins at a radius $r_{CORE}$.

In some preferred embodiments, the core may comprise a relative refractive index profile having a so-called centerline dip which may occur as a result of one or more optical fiber manufacturing techniques. However, the centerline dip in any of the refractive index profiles disclosed herein is optional.

The first annular region 30 extends from the $R_1$ to the outer radius $R_2$. The width $W_2$ is defined as the radial distance between $R_1$ and $R_2$. The midpoint $R_{2MID}$ occurs in the middle of $R_1$ and $R_2$. Preferably, the first annular region 30 is adjacent the central core region 20.

The ring 50 extends from $R_2$ to the ring outer radius $R_3$. The ring width $W_3$ is defined as the radial distance between $R_2$ and $R_3$. The ring 50 has a positive relative refractive index profile with a "peak" or a maximum relative refractive index percent, $\Delta_{3MAX}$. $R_{3HHi}$ marks the first radially inward, or centermost, occurrence of the half-height of $\Delta_{3,MAX}$. $R_{3HHj}$ marks the first radially outward occurrence of the half-height of $\Delta_{3,MAX}$. The ring half-height peak width $HHPW_3$ is bounded by inner and outer radii, $R_{3HHi}$ and $R_{3HHj}$, respectively. The midpoint of the ring half-height peak width $HHPW_3$ occurs at a radius $R_{3HHmid}$ which is half the radial distance between $R_{3HHi}$ and $R_{3HHj}$. $\Delta_{3MAX}$ may occur at $R_{3HHID}$. $R_{3HHMID}$ may coincide with the middle of the ring 50, $R_{3MID}$, between $R_2$ and $R_3$. Preferably, the second annular region 50 is adjacent the first annular region 30.

Preferably the optical fiber disclosed herein comprise a central region 20 comprised of a first portion 20a surrounded by a second portion 20b, where 20a has a maximum relative refractive index $\Delta_{AMAX}$ and 20b has a maximum $\Delta_{BMAX}$, where $\Delta_{AMAX}>\Delta_{BMAX}$. First portion 20a is defined herein to extend from the centerline of the fiber (r>o) to a radius of 2 µm.

Figure 2:
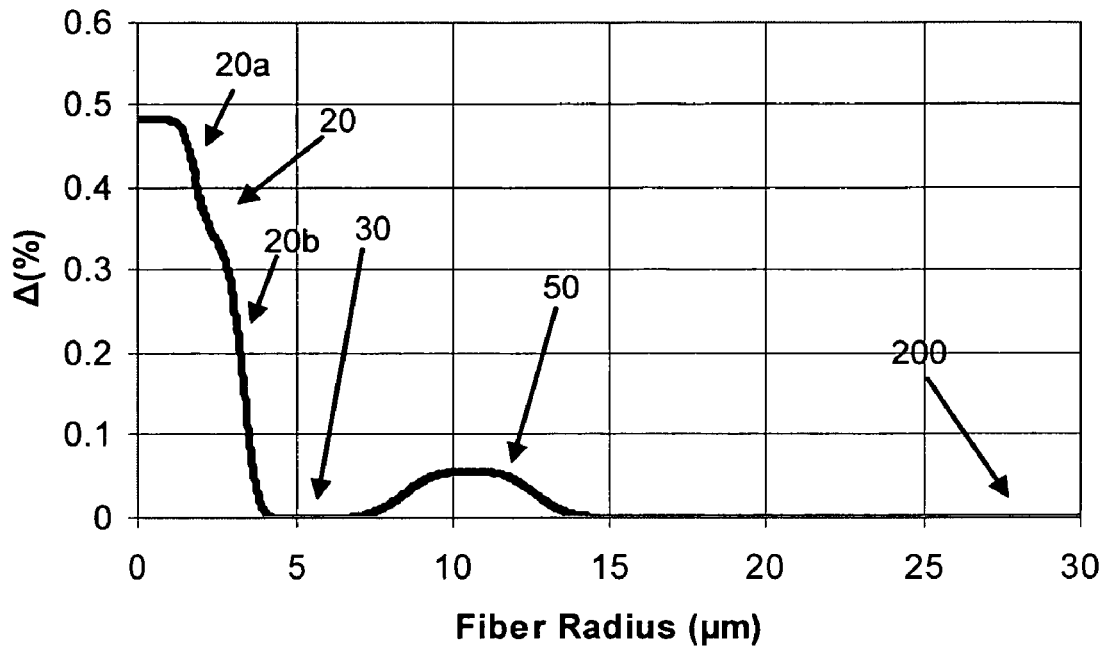
Figure 3:
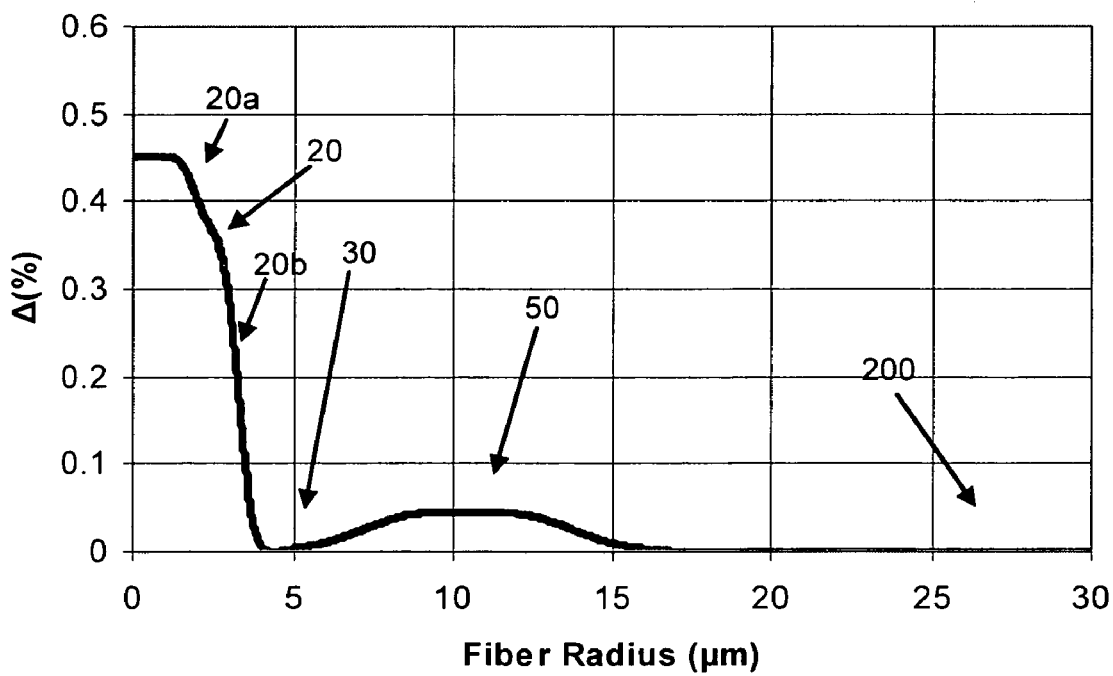

Tables 1–2 list an illustrative first set of preferred embodiments, Examples 1–3 FIGS. 1–3 show the corresponding refractive index profiles of Examples 1–3 in curves 1–3, respectively. The relative refractive index profiles of the core of these fibers is entirely non-negative. The relative refractive index profiles of the core of Example 1 is entirely positive. The central region 20 of these fibers comprises a first portion 20a having relative refractive index $\Delta_{AMAX}$ which is the largest $\Delta\%$ of the fiber ($\Delta_{1MAX}$), and a second portion 20b surrounding and directly adjacent the first portion and having a maximum $\Delta\%$ ($\Delta_{BMAX}$) which is lower than the $\Delta\%$ of the first portion.

Figure 4:
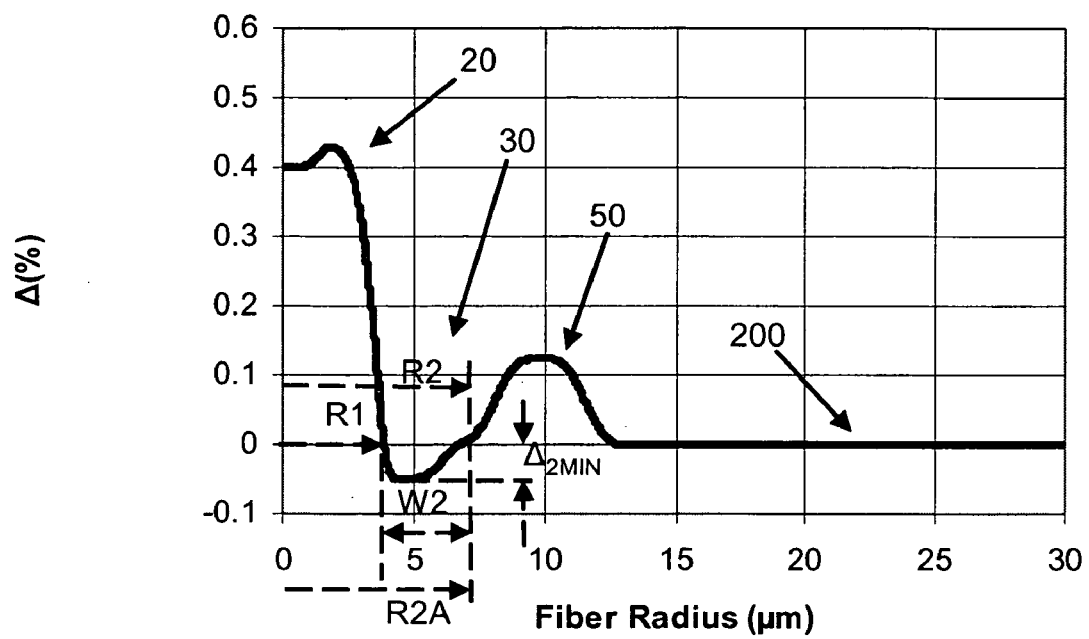
FIGS. 4–5 show refractive index profiles corresponding to a second set of preferred embodiments of an optical waveguide fiber as disclosed herein.
Figure 5:
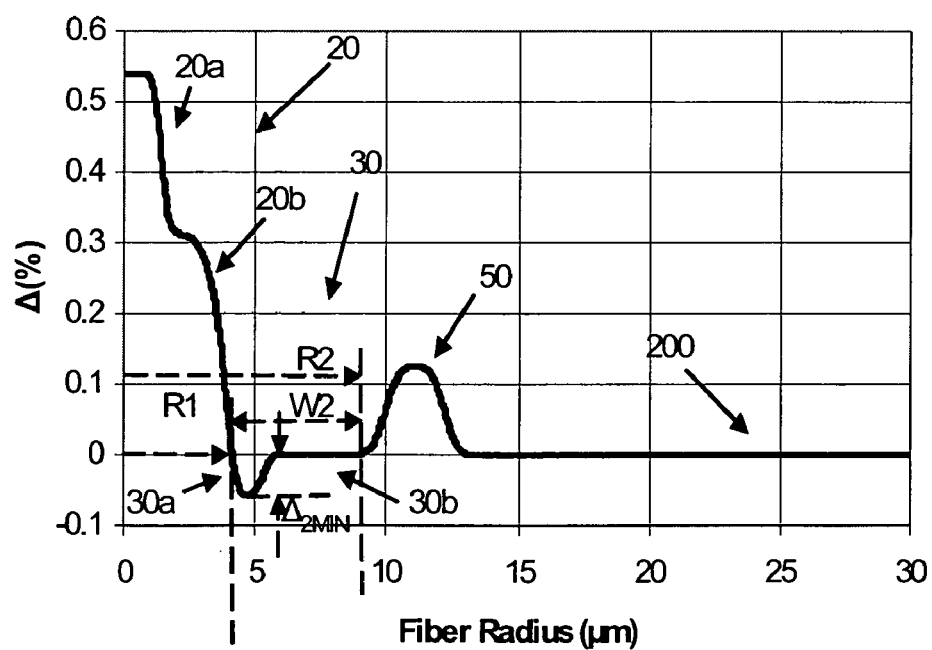

Tables 1–2 also list an illustrative second set of preferred embodiments, Examples 4–5 FIGS. 4–5 show the corresponding refractive index profiles of Examples 4–5 in curves 4–5, respectively. These fibers have a first annular region 30 which comprises a negative relative refractive index portion. The relative index of the first annular region 30 of Example 4 is substantially entirely negative. The first annular region 30 of Example 5 comprises a substantially negative portion 30a and a non-negative (here 0%) portion 30b surrounding and directly adjacent to the negative portion 30a. The central region 20 of Example 5 comprises a first portion 20a having relative refractive index $\Delta_{AMAX}$ which is the largest $\Delta\%$ of the fiber ($\Delta_{1MAX}$), and a second portion 20b surrounding and directly adjacent the first portion and having a maximum $\Delta\%$ ($\Delta_{BMAX}$) which is lower than the $\Delta\%$ of the first portion.

Figure 6:
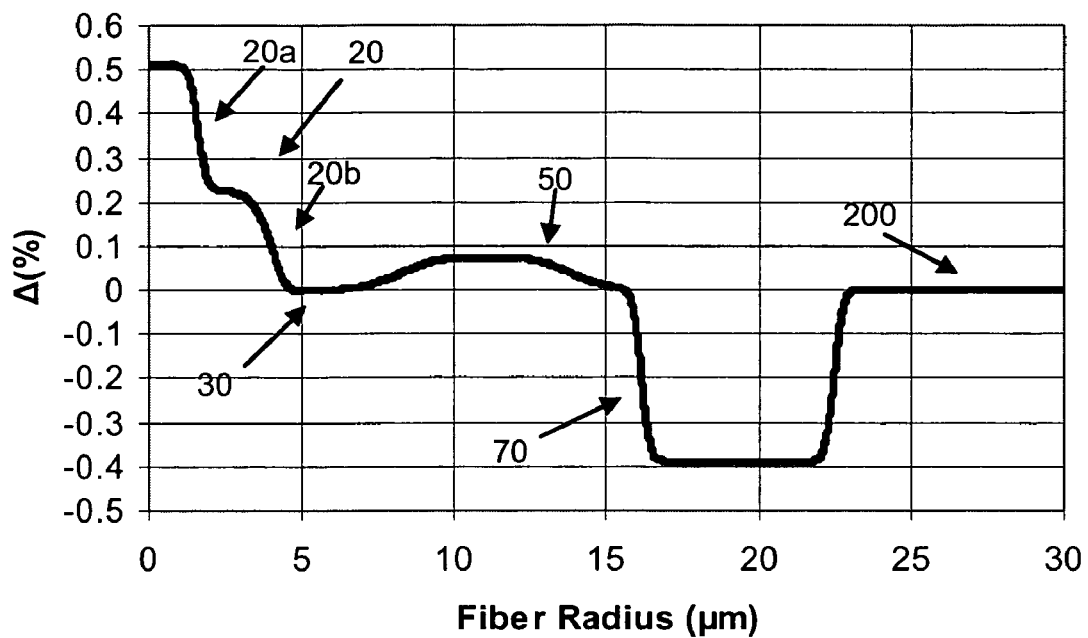
FIGS. 6–8 show refractive index profiles corresponding to a third set of preferred embodiments of an optical waveguide fiber as disclosed herein.
Figure 7:
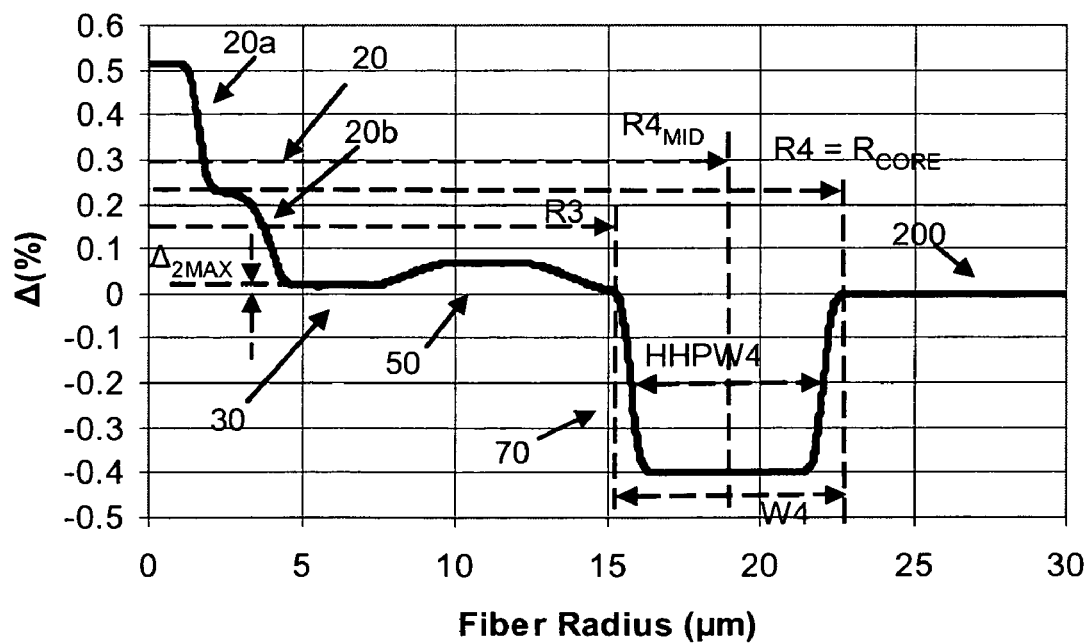
Figure 8:
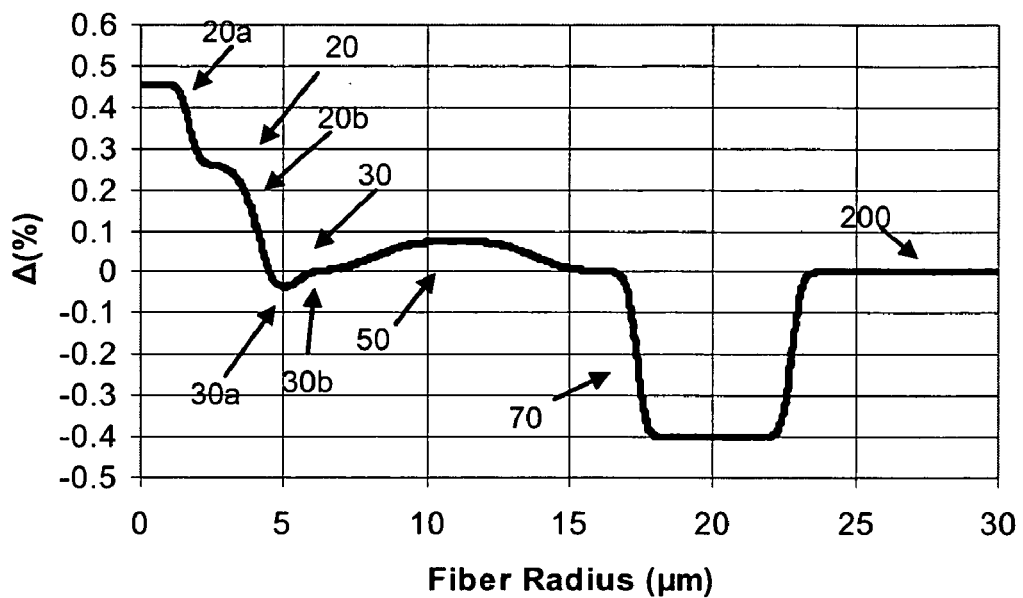

Tables 3–4 list an illustrative third set of preferred embodiments, Examples 6–7 FIGS. 6–7 show the corresponding refractive index profiles of Examples 6–7 in curves 6–7, respectively. The relative refractive index profiles of the core of these fibers comprise a third annular region 70 having a negative $\Delta\%$.

The outermost radius of central core region 20, $R_1$, is preferably the beginning of first annular core region 30 and is defined herein to start at a radius where a straight line approximation, indicated by a line which passes tangentially through the (lowest) quarter-peak height of the central region 20 is extrapolated to intersect with the $\Delta\%=0$ axis at $R_{1QH}$.

TABLE 1

| Example | | 1 | 2 | 3 | 4 | 5 |
|---|---|---|---|---|---|---|
| $\Delta_{1MAX}$ | % | 0.48 | 0.48 | 0.45 | 0.43 | 0.54 |
| $\Delta_{AMAX}$ | % | 0.48 | 0.48 | 0.45 | 0.43 | 0.54 |
| $\Delta_{BMAX}$ | % | 0.38 | 0.38 | 0.40 | 0.43 | 0.31 |
| $|\Delta_{AMAX} - \Delta_{BMAX}|$ | µm | 0.10 | 0.10 | 0.05 | 0 | 0.23 |
| $\Delta_{1MAX} - \Delta_{BMAX}$ | µm | 0.10 | 0.10 | 0.05 | 0 | 0.23 |
| R1A | µm | 2.0 | 2.0 | 2.0 | 2.0 | 2.0 |
| R1QH | µm | 3.5 | 3.5 | 3.5 | 3.6 | 3.8 |
| R1 | µm | 4.0 | 4.1 | 4.1 | 3.9 | 4.1 |
| $\alpha_{1B}$ | | 5.45 | 5.45 | 5.05 | 3.96 | 4.76 |
| $\Delta_{2MIN}$ | % | 0.02 | 0.0 | 0.0 | −0.05 | −0.06 |
| $\Delta_{2MAX}$ | % | 0.02 | 0.0 | 0.0 | 0.0 | 0.0 |
| $|\Delta_2|_{MAX}$ | % | 0.02 | 0.0 | 0.0 | 0.05 | 0.06 |
| R2A | µm | — | — | — | 6.6 | 5.7 |
| R2 | µm | 8.0 | 7.3 | 5.3 | 7.0 | 9.3 |
| $W_2$ | µm | 4.0 | 3.2 | 1.2 | 3.1 | 5.2 |
| R2MID | µm | 6.0 | 5.7 | 4.7 | 5.5 | 6.7 |
| $\Delta_{3MAX}$ | % | 0.06 | 0.06 | 0.05 | 0.12 | 0.13 |
| R3HHi | µm | 8.5 | 8.5 | 7.4 | 8.1 | 10.0 |
| R3HHj | µm | 12.5 | 12.8 | 13.8 | 11.6 | 12.2 |
| HHPW3 | µm | 4.0 | 4.3 | 6.4 | 3.5 | 2.2 |
| R3HHMID | µm | 10.5 | 10.7 | 10.6 | 9.9 | 11.1 |
| R3 = RCORE | µm | 14.5 | 14.6 | 15.7 | 12.5 | 12.9 |
| $W_3$ | µm | 6.5 | 7.3 | 10.4 | 5.5 | 3.6 |
| R3MID | µm | 11.25 | 11.0 | 10.5 | 9.8 | 11.1 |

TABLE 2

| Example | | 1 | 2 | 3 | 4 | 5 |
|---|---|---|---|---|---|---|
| Dispersion @ 1310 nm | ps/nm-km | −6.8 | −6.7 | −6.2 | −5.2 | −6.4 |
| Dispersion @ 1440 nm | ps/nm-km | 2.5 | 2.4 | 2.8 | 2.7 | 2.7 |
| Dispersion @ 1460 nm | ps/nm-km | 3.8 | 3.6 | 4.1 | 3.8 | 3.9 |
| Dispersion @ 1530 nm | ps/nm-km | 8.0 | 7.6 | 8.1 | 7.2 | 7.8 |
| Dispersion @ 1550 nm | ps/nm-km | 9.2 | 8.7 | 9.2 | 8.2 | 8.8 |
| Dispersion @ 1565 nm | ps/nm-km | 10.0 | 9.5 | 10.0 | 8.9 | 9.6 |
| Dispersion @ 1625 nm | ps/nm-km | 13.4 | 12.6 | 13.2 | 11.8 | 12.6 |
| Lambda Zero | nm | 1390 | 1390 | 1382 | 1379 | 1380 |
| Slope @ 1550 nm | ps/nm$^2$-km | 0.057 | 0.054 | 0.055 | 0.048 | 0.052 |
| Slope @ 1310 nm | ps/nm$^2$-km | 0.082 | 0.080 | 0.079 | 0.072 | 0.081 |
| MFD @ 1550 nm | μm | 9.56 | 9.38 | 9.56 | 9.55 | 9.47 |
| Aeff @ 1550 nm | μm$^2$ | 67.3 | 64.9 | 67.7 | 68.9 | 66.3 |
| MFD @ 1310 nm | μm | 7.92 | 7.79 | 7.95 | 7.94 | 7.87 |
| Aeff @ 1310 nm | μm$^2$ | 46.8 | 45.3 | 47.5 | 48.6 | 46.2 |
| Pin Array @ 1550 nm | dB | 17 | 20 | 19 | 20 | 25 |
| Lateral Load @ 1550 nm | dB/m | 1.4 | 1.3 | 1.9 | 3.5 | 2.5 |
| Attenuation @ 1550 nm | dB/km | 0.1898 | 0.1898 | 0.1896 | 0.1907 | 0.1899 |
| LP11 | nm | 1476 | 1414 | 1548 | 1758 | 1569 |
| LP02 | nm | 1617 | 1608 | 1703 | 1754 | 1715 |
| Fiber Cutoff (2 m) | nm | 1017 | 1008 | 1103 | 1158 | 1115 |
| Cable Cutoff | nm | 767 | 758 | 853 | 1058 | 1015 |

TABLE 3

| Example | | 6 | 7 | 8 |
|---|---|---|---|---|
| $\Delta_{1MAX}$ | % | 0.51 | 0.51 | 0.46 |
| $\Delta_{AMAX}$ | % | 0.51 | 0.51 | 0.46 |
| $\Delta_{BMAX}$ | % | 0.24 | 0.25 | 0.29 |
| $|\Delta_{AMAX} - \Delta_{BMAX}|$ | μm | 0.27 | 0.26 | 0.17 |
| $\Delta_{1MAX} - \Delta_{BMAX}$ | μm | 0.27 | 0.26 | 0.17 |
| $R_1$ | μm | 4.7 | 4.8 | 4.5 |
| $R_{1QH}$ | μm | 3.9 | 3.9 | 3.3 |
| $\alpha_{1B}$ | | 4.71 | 4.74 | 4.73 |
| $\Delta_{2MIN}$ | % | 0.0 | 0.02 | −0.03 |
| $\Delta_{2MAX}$ | % | 0.0 | 0.02 | 0.0 |
| $|\Delta_2|_{MAX}$ | % | 0.0 | 0.02 | 0.03 |
| $R_2$ | μm | 6.6 | 7.8 | 5.9 |
| $W_2$ | μm | 1.9 | 3.0 | 1.4 |
| $R_{2MID}$ | μm | 5.7 | 6.3 | 5.2 |
| $\Delta_{3MAX}$ | % | 0.07 | 0.07 | 0.07 |
| $R_{3HHi}$ | μm | 8.2 | 8.2 | 8.2 |
| $R_{3HHj}$ | μm | 13.9 | 13.9 | 13.8 |
| HHPW3 | μm | 5.7 | 5.7 | 5.6 |
| $R_{3HHMID}$ | μm | 11.1 | 11.1 | 11.0 |
| $R_3$ | μm | 15.5 | 15.2 | 16.7 |
| $W_3$ | μm | 8.9 | 7.4 | 10.8 |
| $R_{3MID}$ | μm | 11.1 | 11.5 | 11.3 |
| $\Delta_{4MIN}$ | % | −0.39 | −0.40 | −0.40 |
| $R_4 = R_{CORE}$ | μm | 23.5 | 22.6 | 23.4 |
| $W_4$ | μm | 8.0 | 7.4 | 6.7 |
| $R_{4MID}$ | μm | 19.5 | 18.9 | 20.1 |
| $R_{4HHi}$ | μm | 16.2 | 15.8 | 17.3 |
| $R_{4HHj}$ | μm | 22.5 | 22.1 | 22.8 |
| HHPW4 | μm | 6.3 | 6.3 | 5.5 |
| $R_{4HHMID}$ | μm | 19.4 | 19.0 | 20.1 |

TABLE 4

| Example | | 6 | 7 | 8 |
|---|---|---|---|---|
| Dispersion @ 1310 nm | ps/nm-km | −8.9 | −8.9 | −6.2 |
| Dispersion @ 1440 nm | ps/nm-km | 1.2 | 1.5 | 3.2 |
| Dispersion @ 1460 nm | ps/nm-km | 2.6 | 3.0 | 4.5 |
| Dispersion @ 1530 nm | ps/nm-km | 7.4 | 7.9 | 8.8 |
| Dispersion @ 1550 nm | ps/nm-km | 8.7 | 9.3 | 10.0 |
| Dispersion @ 1565 nm | ps/nm-km | 9.8 | 10.3 | 10.9 |
| Dispersion @ 1625 nm | ps/nm-km | 13.8 | 14.4 | 14.6 |
| Slope @ 1550 nm | ps/nm$^2$-km | 0.067 | 0.069 | 0.061 |
| Slope @ 1310 nm | ps/nm$^2$-km | 0.087 | 0.089 | 0.082 |
| Lambda Zero | nm | 1420 | 1416 | 1385 |

TABLE 4-continued

| Example | | 6 | 7 | 8 |
|---|---|---|---|---|
| MFD @ 1550 nm | μm | 10.45 | 10.46 | 10.45 |
| Aeff @ 1550 nm | μm$^2$ | 80.8 | 80.6 | 80.8 |
| MFD @ 1310 nm | μm | 8.39 | 8.42 | 8.55 |
| Aeff @ 1310 nm | μm$^2$ | 51.8 | 52.1 | 54.3 |
| Pin Array @ 1550 nm | dB | 23 | 18 | 21 |
| Lateral Load @ 1550 nm | dB/m | 1.9 | 1.5 | 1.9 |
| Attenuation @ 1550 nm | dB/km | 0.1863 | 0.1867 | 0.1871 |
| LP11 | nm | 1357 | 1349 | 1417 |
| LP02 | nm | 1311 | 1281 | 1366 |
| Fiber Cutoff (2m) | nm | 1484 | 1495 | 1450 |
| Cable Cutoff | nm | 1234 | 1245 | 1250 |

Preferably, the fibers disclosed herein are made by a vapor deposition process. Even more preferably, the fibers disclosed herein are made by an outside vapor deposition (OVD) process. Thus, for example, known OVD laydown, consolidation, and draw techniques may be advantageously used to produce the optical waveguide fiber disclosed herein. Other processes, such as modified chemical vapor deposition (MCVD) or vapor axial deposition (VAD) or plasma chemical vapor deposition (PCVD) may be used. Thus, the refractive indices and the cross sectional profile of the optical waveguide fibers disclosed herein can be accomplished using manufacturing techniques known to those skilled in the art including, but in no way limited to, OVD, VAD and MCVD processes.

Figure 9:
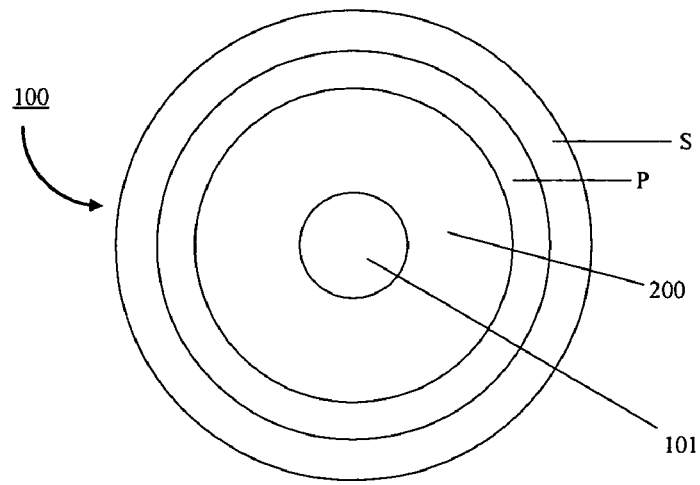
FIG. 9 is a schematic cross-sectional view of a preferred embodiment of an optical waveguide fiber as disclosed herein.

FIG. 9 is a schematic representation (not to scale) of an optical waveguide fiber 100 as disclosed herein having core 101 and an outer annular cladding or outer cladding layer or clad layer 200 directly adjacent and surrounding the core 101.

The clad layer 200 may be comprised of a cladding material which was deposited, for example during a laydown process, or which was provided in the form of a jacketing, such as a tube in a rod-in-tube optical preform arrangement, or a combination of deposited material and a jacket. The clad layer 200 is surrounded by a primary coating P and a secondary coating S. The refractive index of the cladding 200 is used to calculate the relative refractive index percentage as discussed elsewhere herein.

Referring to the Figures, the clad layer 200 has a refractive index of $n_c$ surrounding the core which is defined to have a $\Delta(r)=0\%$, which is used to calculate the refractive index percentage of the various portions or regions of an optical fiber or optical fiber preform.

Preferably, the optical fiber disclosed herein has a silica-based core and cladding. In preferred embodiments, the cladding has an outer diameter, 2*R,max, of about 125 μm. Preferably, the outer diameter of the cladding has a constant diameter along the length of the optical fiber. In preferred embodiments, the refractive index of the optical fiber has radial symmetry. Preferably, the outer diameter of the core has a constant diameter along the length of the optical fiber. Preferably, one or more coatings surround and are in contact with the cladding. The coating is preferably a polymer coating such as acrylate. Preferably the coating has a constant diameter, radially and along the length of the fiber.

Figure 10:
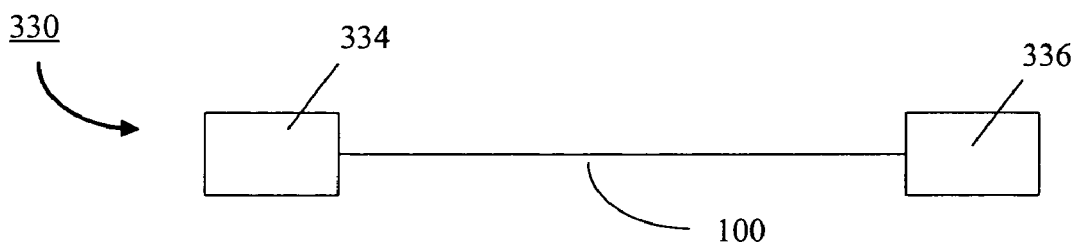
FIG. 10 is a schematic view of a fiber optic communication system employing an optical fiber as disclosed herein.

As shown in FIG. 10, an optical fiber 100 as disclosed herein may be implemented in an optical fiber communication system 330. System 330 includes a transmitter 334 and a receiver 336, wherein optical fiber 100 allows transmission of an optical signal between transmitter 334 and receiver 336. System 330 is preferably capable of 2-way communication, and transmitter 334 and receiver 336 are shown for illustration only. The system 330 preferably includes a link which has a section or a span of optical fiber as disclosed herein. The system 330 may also include one or more optical devices optically connected to one or more sections or spans of optical fiber as disclosed herein, such as one or more regenerators, amplifiers, or dispersion compensating modules. In at least one preferred embodiment, an optical fiber communication system according to the present invention comprises a transmitter and receiver connected by an optical fiber without the presence of a regenerator therebetween. In another preferred embodiment, an optical fiber communication system according to the present invention comprises a transmitter and receiver connected by an optical fiber without the presence of an amplifier therebetween. In yet another preferred embodiment, an optical fiber communication system according to the present invention comprises a transmitter and receiver connected by an optical fiber having neither an amplifier nor a regenerator nor a repeater therebetween.

In preferred embodiments, the system further comprises at least one amplifier, such as a Raman amplifier, optically coupled to the optical fiber section.

The system further preferably comprises a multiplexer for interconnecting a plurality of channels capable of carrying optical signals onto the optical transmission line, wherein at least one, more preferably at least three, and most preferably at least ten optical signals propagate at a wavelength between about 1260 nm and 1625 nm. Preferably, at least one signal propagates in one or more of the following wavelength regions: the 1310 nm band, the E-band, the S-band, the C-band, and the L-band.

In some preferred embodiments, the system is capable of operating in a coarse wavelength division multiplex mode wherein one or more signals propagate in at least one, more preferably at least two of the following wavelength regions: the 1310 nm band, the E-band, the S-band, the C-band, and the L-band. In one preferred embodiment, the system operates at one or more wavelengths between 1530 and 1565 nm.

In one preferred embodiment, the system comprises a section of optical fiber as disclosed herein having a length of not more than 20 km. In another preferred embodiment, the system comprises a section of optical fiber as disclosed herein having a length of greater than 20 km. In yet another preferred embodiment, the system comprises a section of optical fiber as disclosed herein having a length of greater than 70 km.

In one preferred embodiment, the system operates at less than or equal to about 1 Gbit/s. In another preferred embodiment, the system operates at less than or equal to about 2 Gbit/s. In yet another preferred embodiment, the system operates at less than or equal to about 10 Gbit/s. In still another preferred embodiment, the system operates at less than or equal to about 40 Gbit/s. In yet another preferred embodiment, the system operates at greater than or equal to about 40 Gbit/s.

In a preferred embodiment, a system disclosed herein comprises an optical source, an optical fiber as disclosed herein optically coupled to the optical source, and a receiver optically coupled to the optical fiber for receiving the optical signals transmitted through the optical fiber, the optical source having the capability of dithering, and/or phase modulating, and/or amplitude modulating, the optical signal generated by the optical source, and the optical signal is received by the receiver.

Preferably, the optical fibers disclosed herein have a low water content, and preferably are low water peak optical fibers, i.e. having an attenuation curve which exhibits a relatively low, or no, water peak in a particular wavelength region, especially in the E-band.

Methods of producing low water peak optical fiber can be found in PCT Application Publication Numbers WO00/64825, WO01/47822, and WO02/051761, the contents of each being hereby incorporated by reference.

The fibers disclosed herein exhibit low PMD values particulary when fabricated with OVD processes. Spinning of the optical fiber may also lower PMD values for the fiber disclosed herein.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber comprising:
   a core having a centerline and a refractive index profile; and
   a cladding surrounding the core;
   wherein the core comprises:
      a central region extending radially outward from the centerline;
      a first annular region surrounding the central region;
      a second annular region surrounding the first annular region;
   wherein the central region has a relative refractive index profile, $\Delta_1(r)$, having a maximum relative refractive index $\Delta_{1MAX}$ not more than 0.55%, wherein $\Delta_1(r)$ is positive;
   wherein the first annular region has a relative refractive index profile, $\Delta_2(r)$;

wherein the second annular region has a relative refractive index profile, $\Delta_3(r)$, having a maximum relative refractive index $\Delta_{3MAX}$ less than 0.15%, wherein $\Delta_3(r)$ is positive;

wherein the refractive index profile of the core and the cladding are selected to provide a spectral attenuation at 1550 nm of less than 0.195 dB/km.

2. The optical fiber of claim 1 wherein the central region comprises a first portion extending radially outward from the centerline and having a relative refractive index profile, $\Delta_{1A}(r)$, having a maximum relative refractive index $\Delta_{1AMAX}$, and a second portion, surrounding and directly adjacent the first portion, and having a relative refractive index profile, $\Delta_{1B}(r)$, having a maximum relative refractive index $\Delta_{1BMAX}$, wherein $\Delta_{1AMAX} > \Delta_{1BMAX}$.

3. The optical fiber of claim 2 wherein $|\Delta_{1AMAX} - \Delta_{1BMAX}| > 0.05\%$.

4. The optical fiber of claim 3 wherein $0.05\% < |\Delta_{1AMAX} - \Delta_{1BMAX}| < 0.30\%$.

5. The optical fiber of claim 2 wherein $\Delta_{1A}(r)$ is substantially constant.

6. The optical fiber of claim 2 wherein a substantial portion of $\Delta_{1B}(r)$ has an alpha profile.

7. The optical fiber of claim 2 wherein a substantial portion of $\Delta_{1B}(r)$ has an alpha profile with an alpha greater than 1.

8. The optical fiber of claim 1 wherein the second annular region has a width, $w_3$, greater than 4 μm.

9. The optical fiber of claim 1 wherein the first annular region comprises a first portion having a relative refractive index profile, $\Delta_{2A}(r)$, having a maximum absolute magnitude of relative refractive index $|\Delta_{2A}|_{MAX}$, and a second portion, surrounding and directly adjacent the first portion of the first annular segment, and having a relative refractive index profile, $\Delta_{2B}(r)$, having a maximum absolute magnitude of relative refractive index $|\Delta_{2B}|_{MAX}$, wherein $\Delta_{2A}(r)$ is less than 0, and wherein $\Delta_{2B}(r)$ is not less than 0.

10. The optical fiber of claim 1 wherein the refractive index profile of the core and the cladding are selected to provide a dispersion at 1550 nm of between 6 and 10 ps/nm-km.

11. The optical fiber of claim 1 wherein the refractive index profile of the core and the cladding are selected to provide a dispersion slope at 1550 nm of less than 0.060 ps/nm²-km.

12. The optical fiber of claim 1 wherein the first annular region has a maximum absolute magnitude of the relative refractive index, $|\Delta_2|_{MAX}$ less than 0.1%.

13. The optical fiber of claim 1 wherein the first annular region has a maximum absolute magnitude of the relative refractive index, $|\Delta_2|_{MAX}$ less than 0.06%.

14. The optical fiber of claim 1 wherein $\Delta_2(r)$ is positive.

15. The optical fiber of claim 1 wherein $\Delta_2(r)$ is non-negative.

16. The optical fiber of claim 1 wherein $\Delta_2(r)$ is 0.

17. The optical fiber of claim 1 wherein $\Delta_2(r)$ is negative.

18. The optical fiber of claim 1 wherein the first annular region comprises a first portion having a relative refractive index profile $\Delta_{2A}(r) < 0$, and a second portion, surrounding and directly adjacent the first portion of the first annular segment, and having a relative refractive index profile, $\Delta_{2B}(r) \geq 0$.

19. The optical fiber of claim 18 wherein $\Delta_{2B}(r)$ has a maximum absolute magnitude of relative refractive index $|\Delta_{2B}|_{MAX} < 0.03\%$.

* * * * *